United States Patent [19]

Dominguez et al.

[11] 4,254,069
[45] Mar. 3, 1981

[54] HEAT STABLE REACTION INJECTION MOLDED ELASTOMERS

[75] Inventors: Richard J. G. Dominguez; Doris M. Rice, both of Austin, Tex.

[73] Assignee: Texaco Development Corp., White Plains, N.Y.

[21] Appl. No.: 35,025

[22] Filed: Apr. 30, 1979

[51] Int. Cl.³ .............................................. B29D 27/04
[52] U.S. Cl. .................................... 264/51; 264/45.3; 264/50; 264/53; 264/236; 264/328.14; 264/DIG. 5; 264/DIG. 83; 521/904; 521/914
[58] Field of Search ................ 264/54, DIG. 83, 328, 264/45.3, DIG. 5, 53, 50, 51, 236; 521/904, 914

[56] References Cited

U.S. PATENT DOCUMENTS

| | | |
|---|---|---|
| 2,683,730 | 7/1954 | Seeger et al. |
| 2,950,263 | 8/1960 | Abbotson et al. ............... 521/162 X |
| 3,012,008 | 12/1961 | Lister . |
| 3,194,773 | 7/1965 | Hostettler ......................... 528/51 X |
| 3,344,162 | 9/1967 | Rowton ............................ 521/160 X |
| 3,362,979 | 1/1968 | Bentley ............................... 528/83 X |
| 3,394,164 | 7/1968 | McClellan et al. ................ 528/44 X |
| 3,991,147 | 11/1976 | Knipp et al. ...................... 264/328 X |
| 4,098,773 | 7/1978 | Illers et al. ............................. 528/65 |
| 4,111,861 | 9/1978 | Godlewski ........................ 521/904 X |
| 4,131,604 | 12/1978 | Szycher ............................ 264/328 X |

*Primary Examiner*—Philip Anderson
*Attorney, Agent, or Firm*—Carl G. Ries; Robert A. Kulason; Kenneth R. Priem

[57] ABSTRACT

The invention is a method for making reaction injection molded polyurethane of improved properties. The product comprises the cured reaction product of a high molecular weight polyhydric polyether, a low molecular weight active hydrogen containing compound of at least two functionality and a polyisocyanate. The reaction product is cured by subjecting it to an ambient temperature of from about 290°–425° F. for a time sufficient to achieve an improvement in properties. The invention is also the resulting polyurethane.

12 Claims, 4 Drawing Figures

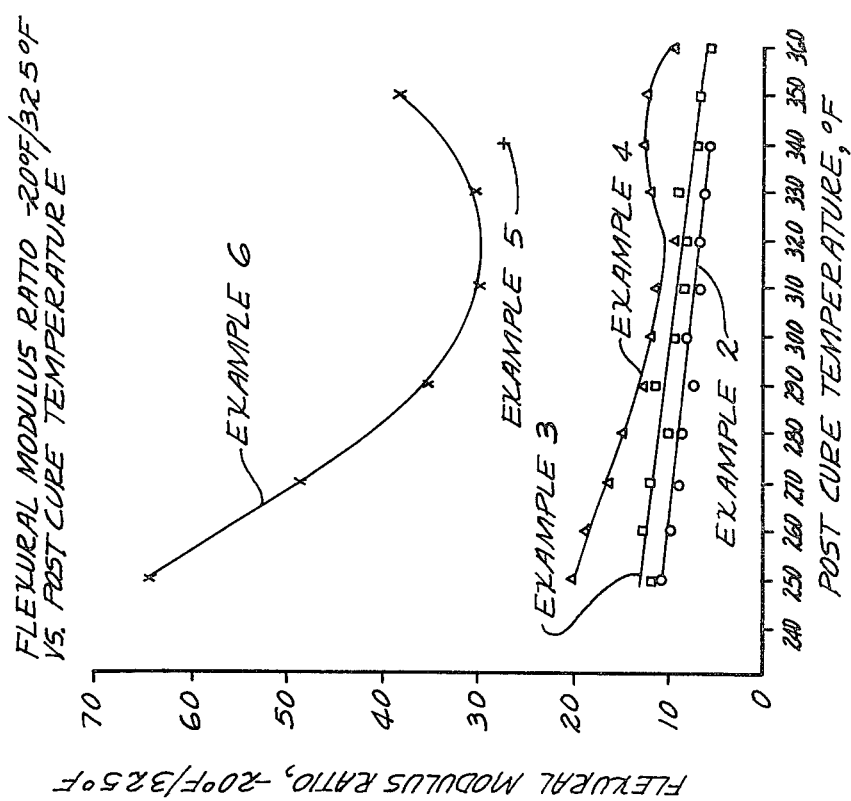
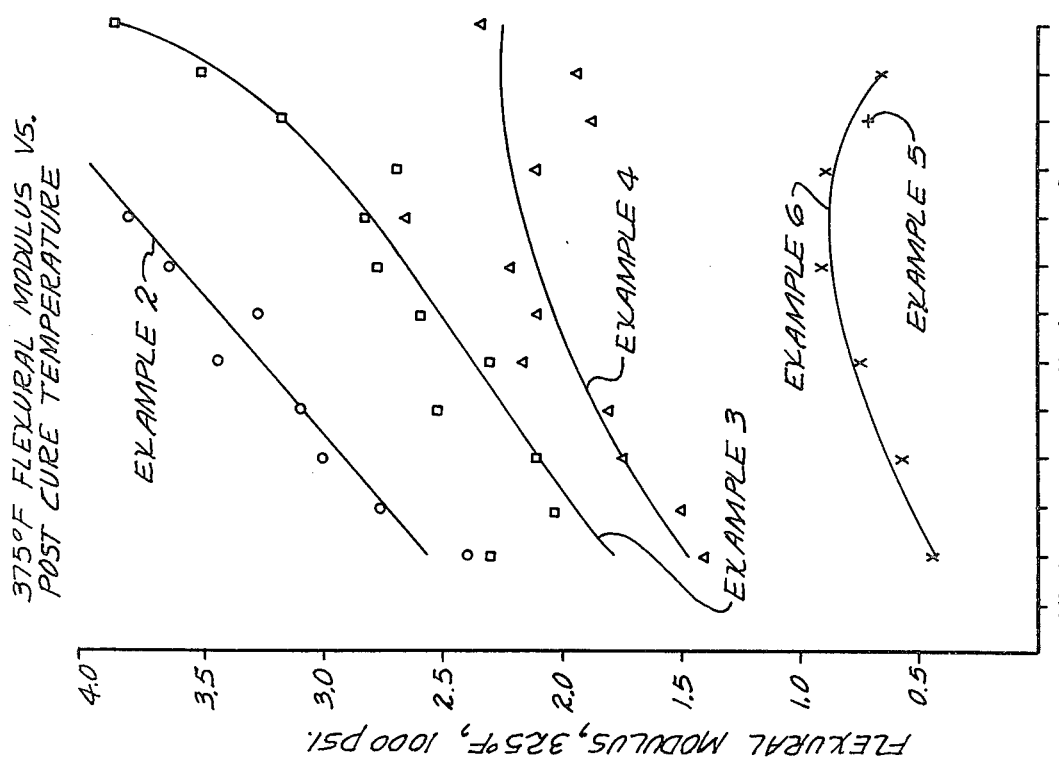

HEAT STABLE REACTION INJECTION MOLDED ELASTOMERS

BACKGROUND OF THE INVENTION

1. Field of the Invention

The invention concerns the field of reaction injection molded polyurethanes.

2. Description of the Prior Art

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. After reaction and demolding, the parts may be subjected to an additional curing step which comprises placing the parts in an ambient temperature of about 250° F. Indeed, the standard industry practice has been to post cure RIM parts at 250° F. The article "Processing and Properties of a Microcellular Foam System with Low Sensitivity to Temperature", Robert L. McBrayer and Gary J. Griffin, Journal of Cellular Plastics, July through August 1977, reveals temperatures up to 300° F. However, the article indicates that temperatures greater than 250° F. may not be practical due to part distortion. U.S. Pat. No. 4,098,773 refers to heating RIM elastomers in the reaction mold without waiting for the reaction to complete at temperatures ranging from 212° F. to 392° F. The patent states that preferably this curing/reacting temperature is from 212° F. to 300° F. However, in the only examples where parts were actually heated in this manner, temperatures of only 212° and 248° F. were used.

It has been surprisingly discovered that RIM polyurethane parts may be post cured at temperatures well above 300° F. and that a substantial improvement in properties takes place due to the high post curing temperature.

SUMMARY OF THE INVENTION

The invention is a method for making reaction injection molded (RIM) polyurethane of improved properties wherein polyhydric polyethers of above about 1000 molecular weight, a chain-extender comprising low molecular weight active hydrogen containing compound of at least two functionality and a polyisocyanate is post cured at an ambient temperature of from about 290° to 425° F., preferably about 310° F. to 350° F., for a length of time sufficient to achieve an improvement in properties. The invention is also the resulting RIM polyurethane parts.

BRIEF SUMMARY OF THE DRAWINGS

FIG. 3 shows the Flexural Modulus versus the post cure temperature.

FIG. 4 shows the Flexural Modulus ratio at −20° F. and 325° F. versus the post cure temperature.

DESCRIPTION OF THE PREFERRED EMBODIMENTS

Figure 2:
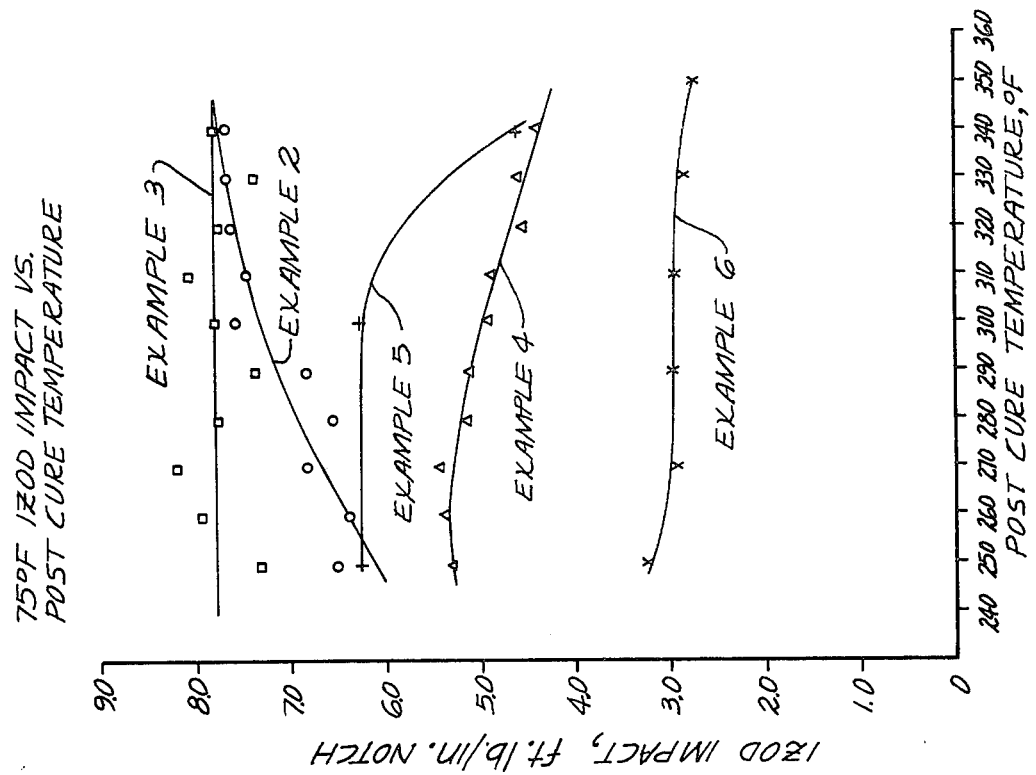
FIG. 2 shows the Izod Impact versus the post cure temperature.

An object of this invention is to produce RIM polyurethane parts which have improved high temperature performance. For example, an automobile exterior body panel may be prepared by this invention which could be assembled on an automobile, painted and baked at 325° F. to cure the paint. Prior art RIM polyurethane parts would distort at this high paint curing temperature normally reserved for metal parts. However, the RIM parts prepared according to this invention remain stable even at this high temperature. Even more surprising, formulations prepared according to this invention exhibit excellent dimensional stability and stiffness at temperatures of 325° F. or higher with no significant sacrifice in overall properties and even display improved Izod impact properties. Prior art RIM polyurethane materials have been unable to withstand the severe paint baking conditions that our materials endure without adverse effect. Also, in softer RIM formulations for automotive fascia, significant improvement in 250° F. heat stability are observed when RIM parts are prepared according to this invention. Therefore, it is an object of this invention to prepare RIM polyurethane elastomers having significantly improved high temperature dimensional stability and stiffness.

It was surprisingly discovered that a significant improvement in high temperature performance of RIM polyurethane elastomers was gained by curing the demolded elastomers at about 290° F. to 425° F. and preferably, from about 310° F. to 350° F. rather than the industry standard of 250° F. As will be shown in the examples which follow, the improved properties are noted with a wide variety of formulations. However, some formulations are particularly preferred because their property improvements are outstanding even when compared to improved parts made according to this invention. The preferred reactants for this invention are those which yield an isocyanate-chain extender reaction with a high glass transition temperature. This glass transition temperature should be above the maximum ambient temperature to which the finished product will be subjected. For example, a paint oven is normally operated at about 325° F. The preferred polyols are those which do not significantly adversely affect the glass transition temperature of the isocyanate-chain extender reaction.

The polyols useful in the process of this invention include polyether polyols, polyester diols, triols, tetrols, etc., having an equivalent weight of at least 500, and preferably at least 1000 up to about 3000. Those polyether polyols based on trihydric initiators of about 4000 molecular weight and above are especially preferred. The polyethers may be prepared from ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

The chain-extenders useful in the process of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. These chain-extenders produce a polymer having a high glass transition temperature and/or high melting points when reacted with a suitable diisocyanate to be discussed below. It has been discovered that the polyurethane polymers of this invention which have a high glass transition temperature and a high melting point also show the improved properties in the process of this invention. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi- are prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

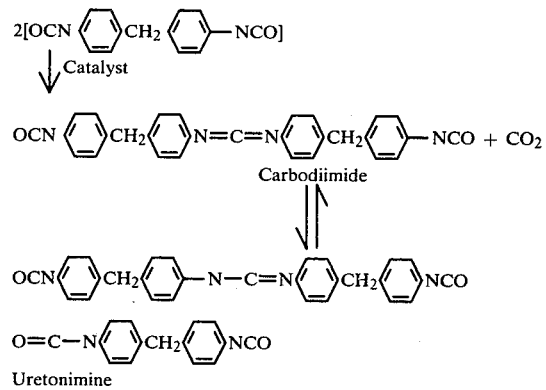

Examples of commercial materials of this type are Upjohn's Isonate 125M (pure MDI) and Isonate 143L ("liquid" MDI).

The foam formulation includes a great number of other recognized ingredients usually present in the polyol blend, such as additional cross-linkers—catalysts, extenders, blowing agents and the like. Blowing agents may include halogenated low-boiling hydrocarbons, such as trichloromonofluoromethane and methylene chloride, carbon dioxide, nitrogen, etc., used. Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g. trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines, such as N,N,N'N'-tetramethyl-1, 3-butanediamine.

Other conventional formulation ingredients may also be employed, such as, for example, foam stabilizers, also known as silicone oils or emulsifiers. The foam stabilizer may be an organic silane or siloxane. For example, compounds may be used having the formula:

$$RSi[O-(R_2SiO)_n-(oxyalkylene)_mR]_3$$

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

The RIM polyurethane elastomers of this invention are made in the conventional manner in mold and are then post cured at temperatures of about 290° F. to 425° F. and preferably about 310° F. to 350° F. Unexpectedly, these high post curing temperatures increase the high temperature stability of the finished RIM polyurethane elastomer. As the following examples will show, the heat sag at 325° F. is improved substantially at post cured temperatures above 290° F. Also, surprisingly, many formulations possessing this higher temperature stability show no less and sometimes greater Izod impact resistance when cured at the high temperatures of this invention.

Another type of additive which may be required as post curing temperatures approach 400° F. or more is an antioxidant. The materials which are well known to those skilled in the art include hindered phenols as well as other materials.

In a particularly preferred embodiment of this invention, a high molecular weight polyether polyurethane polyol of 5000 molecular weight or above is combined with ethylene glycol and standard catalysts system is combined with 4,4'-diphenylmethane diisocyanate (MDI) along with other necessary ingredients known in the art and subjected to a normal RIM molding procedure. The reacted RIM part has been removed from the mold and post cured at a temperature above 310° F. for about 30 minutes. As will be shown below such a procedure caused a striking improvement in heat sag over procedures of the prior art where lower post cured temperature is used. Also, this particular formulation showed an improvement over other formulations although all formulations tested displayed an improvement as post cured temperature was increased.

The following examples demonstrate our invention. They are not to be construed as limiting our invention in any way but merely to be exemplary of the improvement and manner in which our invention may be practiced.

A glossary of terms and materials used in the following examples follows the examples.

EXAMPLE I

THANOL ® SF-5505* (12.0 pbw), ethylene glycol (6.44 pbw), L 5430 silicone oil (0.2 pbw), THANCAT ® DMDEE (0.25 pbw), dibutyltin dilaurate (0.015 pbw) and Foamrez UL-29 (0.025 pbw) were premixed and charged into the B-component working tank of an Admiral 40 lb. per min. low pressure mechanical mix foam machine. Isomate 143L (30.06 pbw) and P55-O quasi prepolymer (5.24 pbw) were premixed and charged into the A-component working tank. The A-component temperature was adjusted to 80° F. and the B-component temperature was adjusted to 120° F. The machine was calibrated to deliver 4750 gms/min of B-component and 8870 gms/min of A-component (isocyanate to hydroxyl ratio=1.05). The ingredients were then mixed by a spiral type mixer turning at 4500 rpm and injected into a 15 in. by 15 in. by 0.150 in. steel mold preheated to 145° F. through a gating system which was built into the mold. A 3.2 second shot yielded a flat plaque having an overall density of about 62 pcf. Release time was 45 seconds from pour.

*Glossary of terms and tradenames follows the Examples.

Two identical plaques were prepared and one was post cured at 250° F. for ½ hour while the other was post cured at 325° F. for ½ hour. After a week's rest at 75° F. and 50% relative humidity, 1 in. by 6 in. samples were cut from each of the above plaques. The samples were clamped at one end such that they projected horizontally with exactly 4.0 inches of sample remaining unsupported. After ½ hour the distance from the unsupported end to the base of the clamping fixture was measured. The fixture was then placed into a force draft oven at 325° F. for 30 minutes. After 30 minutes cooling, the distance from the end of the sample to the base of the clamping fixture was again measured. The difference in these two measurements (in inches) is termed the heat sag. The sample post cured at 325° F. exhibited a heat sag of 0.10 inches while the sample post cured at 250° F. exhibited a heat sag of 0.42 inches. The heat sag was also determined for identical plaques which were post cured at these temperatures for one hour. The heat sags were essentially identical to those obtained at ½ hour cure time. From these experiments it was concluded that the high temperature post cure caused a striking improvement in heat sag. The heat sag is analagous to past serviceability at the measured temperature. It is one of the standard tests for heat serviceability used by the automotive industry.

EXAMPLE II

The B-component of Example I was charged into the B-component working tank of a Cincinnati Milacron LRM-2 impingement mix RIM machine. Isonate 143L (29.0 pbw) and L55-O quasi prepolymer (5.63 pbw) were premixed and charged into the A-component working tank. The A-component temperature was adjusted to 75° F. and the B-component temperature was adjusted to 100° F. The machine was then set to deliver the components at an injection rate of 3 lbs/sec and at a weight ratio of 0.546 B-component/A-component. This represents an isocyanate index of 1.02. The components were then injected at an impingement pressure of approximately 900 psi into a steel plaque mold having cavity dimensions of 0.125 inches by 24 inches by 48 inches. The mold temperature was set at 150° F. The parts were released in 60 seconds from pour. The plaques had a specific gravity of about 1.1.

A number of identical plaques were prepared and cured within 15 minutes from pour for ½ hour at temperatures ranging from 250° F. to 350° F. in 10° F. increments. After one week's rest at 75° F. and 50% relative humidity, the heat sag of the samples cured at various temperatures were determined by the procedure outlined in Example I except an overhang of 6 inches instead of 4 inches was used in order to subject the samples to a more severe test so that smaller variations in heat sag could be seen. The data are presented graphically in FIG. I. As can be seen from the figure, the heat sag improved dramatically as the cure temperature is increased with a leveling of the effect starting about 280° F. All plaques were characterized by good dimensional stability upon removal from the cure oven (no significant distortion) until a cure temperature of 350° F. was reached at which point the plaques distorted badly.

EXAMPLE III

Figure 1:
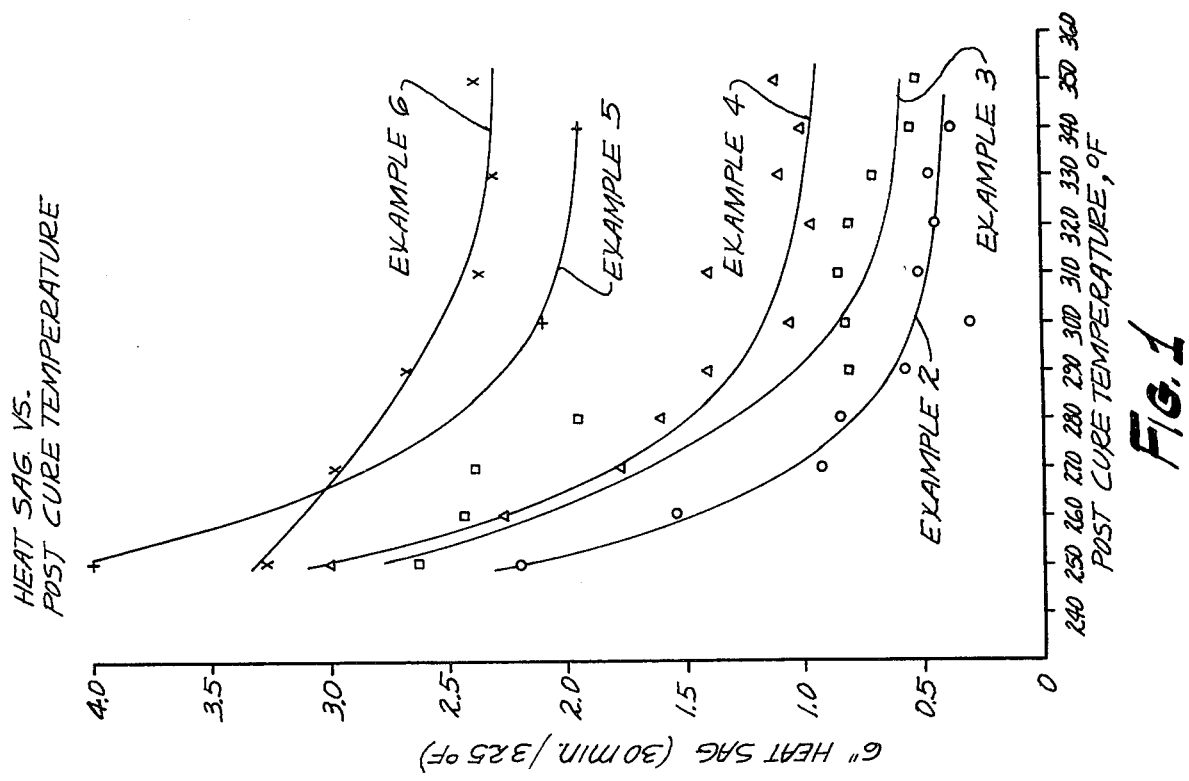
FIG. 1 shows the Heat Sag versus the post cure temperature of various RIM parts.

The experiment in Example II was repeated except that a mixture of Isonate 143L (28.61 pbw) and P55-O quasi prepolymer (5.54 pbw) was substituted for the A-component of Example II. In this case, the B-component to A-component ratio was set at 0.544 (1.02 isocyanate index). The data are presented graphically in FIG. I. As can be seen from FIG. 1, this RIM elastomer responded to cure temperature in a very similar manner to Example II. The significant difference is that the heat sag does not reach as low a value as Example II.

EXAMPLE IV

The experiment in Example II was repeated except that a mixture of Isonate 191 (28.52 pbw) and P55-O quasi prepolymer (5.53 pbw) was substituted for the A-component ratio was set at 0.556 (1.05 isocyanate index). The data are presented graphically in FIG. I. As can be seen from FIG. I, this RIM elastomer responded to cure temperature in a very similar manner to Examples II and III. The significant difference is that the heat sag does not reach as low a value as in Example II or III.

EXAMPLE V

The experiment in Example II was repeated at 250°, 300° and 340° F. post cure temperatures except that the chain-extender in the B-component was 1,4-butanediol (9.35 pbw). In this case, the B-component to A-component weight ratio was set at 0.631 (1.02 isocyanate index). The data are presented graphically in FIG. I. As can be seen from FIG. I, this RIM elastomer responded to cure temperature in a very similar manner to Examples II, III and IV. The significant difference is that the heat sag does not attain as low a value as in Examples II, III or IV. It should be noted, however, that the heat sag (cured at 325° F.) measured at 250° F. on a 4 inch sample (industry standard) are excellent (0.03 in.). Thus, this system is no doubt excellent for lower temperature applications.

EXAMPLE VI

The experiment in Example II was repeated at 250°, 270°, 290°, 310°, 330° and 350° F. post cure temperatures except that a mixture of Papi 901 (27.58 pbw) and P55-O (5.35 pbw) was substituted for the A-component of Example II. In this case, the B-component to A-component ratio was set at 0.575 (1.05 isocyanate index). The data are presented graphically in FIG. I. As can be seen from FIG. I, this RIM elastomer responded to cure temperature similarly to Examples II, III, IV and V except that the improvement in heat sag obtained by high temperature cure is much less than in the other examples. It should also be noted that this elastomer is characterized by the poorest heat sag of all the elastomers tested.

More extensive testing was done on Examples II through VI. The following table is a summary of results.

| Property | Example II | | Example III | | Example IV | | Example V | | Example VI | |
| --- | --- | --- | --- | --- | --- | --- | --- | --- | --- | --- |
| Cure T, °F. | 250 | 330 | 250 | 330 | 250 | 320 | 250 | 350 | 250 | 310 |
| Isocyanate Index | 1.02 | 1.02 | 1.02 | 1.02 | 1.05 | 1.05 | 1.02 | 1.02 | 1.05 | 1.05 |
| Heat sag, in 6" overhand | 2.2 | 0.5 | 2.6 | 0.7 | 3.0 | 1.0 | >4 | 2.0 | 3.3 | 2.4 |
| Izod Impact, ft. lb/in. notch | 6.5 | 7.6 | 7.3 | 7.4 | 5.3 | 4.6 | 6.3 | 4.6 | 3.2 | 2.8 |
| Tensile, psi | 5000 | 5070 | 4900 | 5100 | 5500 | 5700 | 4170 | 4450 | 5300 | 5500 |
| Elongation, % | 123 | 127 | 133 | 138 | 106 | 97 | 128 | 93 | 63 | 67 |
| Tear, pli | 630 | 570 | 650 | 590 | 605 | 530 | 728 | 513 | 488 | 482 |
| Flexural modulus, psi × 10³ | | | | | | | | | | |
| (a) 75° F. | 147.0 | 146.7 | 136.5 | 129.8 | 157.3 | 151.3 | 124.6 | 124.2 | 158.4 | 158.9 |
| (b) −20° F. | 254.0 | 236.8 | 263.1 | 231.9 | 274.2 | 231.5 | 253.6 | 199.5 | 283.9 | 271.4 |
| (c) 158° F. | 82.0 | 93.8 | 75.1 | 86.1 | 87.5 | 92.2 | 59.9 | 76.5 | 87.0 | 91.7 |
| (d) 325° F. | 24.1 | 40.4 | 23.1 | 27.0 | 14.1 | 26.7 | — | 7.2 | 4.4 | 9.1 |
| Flexural modulus ratio | | | | | | | | | | |
| b/c | 3.1 | 2.5 | 3.5 | 2.7 | 3.1 | 2.5 | 4.2 | 2.6 | 3.3 | 3.0 |
| b/d | 10.5 | 5.9 | 11.4 | 8.6 | 19.5 | 8.7 | — | 27.7 | 64.5 | 29.8 |

Study of the above table clearly shows that the isocyanate-chain extender reaction product and post cure temperatures have a dramatic effect on the properties of the resulting RIM elastomer. Generally, within each example, properties are better for the elastomers cured at higher temperature. This is especially true of the thermal properties (heat sag, flexural moduli and flexural modulus ratios). The elastomers cured at higher temperatures are more resilient (lower −20° F. flexural modulus) at low temperature and stiffer at high temperature (high 158° and 325° F. flexural modulus). The elastomers cured at higher temperatures also show less temperature sensitivity in flexural modulus (lower flexural modulus ratios). It is clear from the table that the absolute magnitude of the physical properties, especially the thermal properties, is partially controlled by the isocyanate chain-extender reaction product, properly post cured (post cured at higher temperature). Examples II and III are preferred. The other examples show less improvement. From these considerations, it is evident that the isocyanate in the A-component should be relatively pure and either have or possess the capability of approaching a functionality of 2.0. Also, it is evident that the chain extender employed has a great effect on final heat properties. The RIM elastomer of Example V is less heat stable than the one of Example II. Prolonged post cure time or higher post cure temperature might make the RIM elastomer in Example V acceptable in heat properties.

FIG. II graphically presents the behavior of Izod Impact as a function of cure temperature and the composition of the isocyanate chain-extender reaction product. It is clear from FIG. II that in some cases, the Izod Impact increases with increasing cure temperature (Example II) in some cases it decreases with increasing cure temperature (Examples IV and V) and in some cases remains rather constant (Examples III and VI). Also, the magnitude of the highest Izod Impact value attainable within an example seems to be a function of chain extender and isocyanate. Again, Examples II and III are preferred in this invention. From these considerations, it is again evident that the isocyanate in the A-component should be relatively pure and either have or possess the capability of approaching a functionality of 2.0. Also, the chain extender selected is critical to the final Izod Impact achieved.

In FIG. III, the flexural modulus at 325° F. is presented graphically as a function of cure temperature. These data correlate to the heat sag data in FIG. I. The higher the flexural modulus at 325° F., the lower the heat sag measured at 325° F. Also, it is apparent that the chain extender and isocyanate chosen to form the isocyanate chain-extender reaction product is as important as the cure temperature. The same conclusions are drawn from this figure as far as selection of one temperature, chain extender and isocyanate are concerned as have been drawn from analysis of the data in FIGS. I and II.

In FIG. IV, the Flexural Modulus Ratio (−20° F./325° F.) as a function of cure temperature is presented graphically. These data show the importance of cure temperature and selection of isocyanate and chain-extender with respect to changes in Flexural Modulus. The lower the Flexural Modulus Ratio the less sensitive is the flexural modulus to changes in temperature. The same conclusions are drawn from this figure as drawn from FIGS. I–III.

EXAMPLE VII

The experiment of Example II was repeated except that the THANOL SF-5505 level was increased from 12 pbw to 16 pbw. This changed the flexural modulus at room temperature from about 140,000 psi (Example II) to about 90,000 psi (Example VII). The 6 inch heat sag at 325° F. for ½ hour was determined on samples cured at 250° F. (73.5 in.) and 325° F. (0.6 in.). Thus, the heat stability of the elastomer increased dramatically (lower heat sag) when cured at the higher temperature. This experiment extends the practice of our invention to lower flexural modulus RIM elastomers.

EXAMPLE VIII

The experiment of Example II was repeated with the following formulation:

| B-Component | A-Component (1.02 Isocyanate Index) |
|---|---|
| THANOL SF-6503, 13.5 pbw | Isonate 143L, 26.32 pbw |
| Ethylene Glycol, 6.44 pbw | P-55-0 (quasi-prepolymer) 5.21 pbw |
| Dibutyl tin dilaurate, 0.04 pbw | |

A sample cured at 325° F. for ½ hour exhibited a 4 inch heat sag (determined at 325° F. for ½ hour) of 0.15 inches while a sample cured at 250° F. for ½ hour had a heat sag (determined as above) of 0.93 inches. The purpose of this experiment was to extend our invention to a different polyol (THANOL SF-6503) which has a higher molecular weight than THANOL SF-5505.

EXAMPLE IX

The experiment of Example I was repeated with the following formulation:

| B-Component | A-Component (0.98 Isocyanate Index) | |
|---|---|---|
| Experimental 4,000 molecular weight diol (5145-85), | Isonate 143L | 28.9 pbw |
| | L (5145-85)-0 quasi prepolymer | 5.6 pbw |
| | 12 pbw | |
| Ethylene glycol | 6.44 pbw | |
| L5430 Silicone oil | 0.2 pbw | |
| THANCAT DMDEE | 0.25 pbw | |
| Foamez UL29 | 0.025 pbw | |
| Dibutyl tin dilaurate | 0.015 pbw | |

A sample cured at 325° F. for ½ hour exhibited a 4 inch heat sag (determined at 325° F. for ½ hour) of 0.02 inches while a sample cured at 250° F. for ½ hour had a heat sag (determined as above) of 0.42 inches. These results indicate that polyether polyols having a different internal structure are useful for this invention. The 5145-85 experimental diol is a 4,000 molecular weight diol based on mixtures of butylene oxide and ethylene oxide and capped with ethylene oxide to yield a primary hydroxyl content of about 90%.

EXAMPLE X

The experiment of Example II was repeated with the following formulation:

| B-Component | A-Component (1.02 Isocyanate Index) | |
|---|---|---|
| THANOL SF-6503 | 100 pbw | Isonate 143 L 128.8 pbw |
| Ethylene glycol | 25.6 pbw | |
| Dibutyl tin dilaurate | 0.2 pbw | |
| Fluorocarbon 11-B | 2.0 pbw | |

Samples of the above elastomer cured at 325° F. for ½ hour exhibited a 6 inch heat sag (325° F. for ½ hour) of 1.3 inches while those cured at 250° F. for 1 hour had a heat sag (same conditions as above) of greater than 3.5 inches. This example demonstrates the utility of this invention in improving the high temperature properties of RIM elastomers having an intermediate flexural modulus (about 60,000 psi).

EXAMPLE XI

The experiment of Example I was repeated with the following formulation:

| B-Component | A-Component (0.98 Isocyanate Index) | |
|---|---|---|
| THANOL SF-5505 | 16 pbw | Isonate 143L 28.5 pbw |
| Ethylene glycol | 5.0 pbw | L-55-0 quasi prepolymer 5.52 pbw |
| Monoethanolamine | 1.44 pbw | |
| L5430 Silicone Oil | 0.2 pbw | |
| THANCAT DMDEE | 0.25 pbw | |
| Foamez UL29 | 0.025 pbw | |
| Dibutyl tin dilaurate | 0.015 pbw | |

The above formulation reacted too rapidly to mold a complete plaque on this low pressure foam machine. A partial plaque was cut into two pieces. One piece was cured for ½ hour at 325° F. and the other piece was cured for ½ hour at 250° F. The 325° F. cured piece exhibited a heat sag (6 inch overhang heated for 30 minutes at 325° F.) of 0.6 inches while the piece cured at 250° F. had a heat sag (same conditions as above) of 2.5 inches. This experiment demonstrates the utility of still another chain-extender, monoethanolamine, in the practice of this invention. Monoethanolamine has one primary amine per molecule and is an example of a urea linkage forming chain extender.

GLOSSARY OF TERMS AND MATERIALS

RIM—Reaction Injection Molding

Polyol—A di or greater functionality high molecular weight alcohol or amine terminated molecule composed of ether groups such as ethylene, propylene, butylene, etc., oxides.

MDI—4,4' diphenyl methane diisocyanate

Isonate 143L—Pure MDI isocyanate modified so that it is a liquid at temperatures where MDI crystallizes—product of the Upjohn Co.

PAPI 901—A crude form of MDI containing about 30% higher functionality isocyanates and other impurities—product of the Upjohn Co.

Isonate 191—Thought to be a 50/50 blend of Isonate 143L and PAPI 901—product of the Upjohn Co.

Quasi-prepolymer L-55-0—A quasi-prepolymer formed by reacting weights of Isonate 143L and THANOL SF-5505.

Quasi-prepolymer P-55-0—A quasi-prepolymer formed by reacting equal weights of PAPI 901 and THANOL SF-5505.

Quasi-prepolymer L-(5145-85)-0—A quasi-prepolymer formed by reacting equal weights of Isonate 143L and experimental polyol 5145-85.

THANOL SF-5505—a 5500 molecular weight polyether triol containing approximately 80% primary hydroxyl groups.

THANOL SF-6503—A 6500 molecular weight polyether triol containing oxyethylene groups and approximately 90% primary hydroxyl groups.

L5430 Silicone Oil—A silicone glycol copolymer surfactant containing reactive hydroxyl groups. Product of Union Carbide.

THANCAT DMDEE—Dimorpholinodiethylether

Foamurez UL-29—A stannic diester of a thiol acid. The exact composition is unknown. Product of Witco Chemical Co.

Fluorocarbon 11-B—An inhibited trichlorofluoromethane.

We claim:

1. A method of making a foamed polyurethane elastomer of improved properties which comprises injecting via a RIM machine into a mold cavity of the desired configuration a foam formulation, demolding the molded article and post curing the demolded article at a temperature from about 290° F. to 425° F. for a time sufficient to achieve an improvement in properties said formulation being the reaction product of an aromatic polyisocyanate, a polyol of above about 500 equivalent weight and a chain-extending agent comprising a low molecular weight active hydrogen containing component of at least two (2) functionality wherein the polyisocyanate and chain-extender are chosen from products which yield an isocyanate chain-extender reaction product with a glass transition temperature of above about 325° F. and wherein the polyol is chosen from those products which do not significantly adversely affect the glass transition temperature of the isocyanate chain-extender reaction product.

2. A method of claim 1 wherein said chain-extending agent comprises ethylene glycol.

3. A method of claim 1 wherein said aromatic polyisocyanate is 4,4'-diphenylmethane diisocyanate.

4. A method of claim 1 wherein said polyol is a diol or triol having an equivalent weight of from about 1000 to about 3000 and contains at least about 50 percent primary hydroxyl groups.

5. The method of claim 1 wherein said polyol is a polyether polyol.

6. In a method for making a polyurethane elastomer of improved properties wherein a polyol of above about 500 equivalent weight, an aromatic polyisocyanate and a chain-extending agent comprising a low molecular weight active hydrogen containing compound of at least two (2) functionality is injected into a mold cavity of the desired configuration wherein the polyisocyanate and chain-extender are chosen from products which yield an isocyanate chain-extender reaction product with a glass transition temperature of above about 325° F. and wherein the polyol is chosen from those products which do not significantly adversely affect the glass transition temperature of the isocyanate chain-extender reaction product wherein a molded article is formed the improvement which comprises
post curing the molded article at a temperature of about 290° F. to 425° F. for a time sufficient to achieve an improvement in properties.

7. In a method for making a polyurethane elastomer of improved properties wherein a polyol of above about 500 equivalent weight, an aromatic polyisocyanate and a chain-extending agent comprising a low molecular weight active hydrogen containing compound of at least two (2) functionality is injected into a mold cavity of the desired configuration wherein the polyisocyanate and chain-extender are chosen from products which yield an isocyanate chain-extender reaction product with a glass transition temperature of above about 325° F. and wherein the polyol is chosen from those products which do not significantly adversely affect the glass transition temperature of the isocyanate chain-extender reaction product wherein a molded article is formed the improvement which comprises
post curing the molded article at a temperature of about 310° F. for a time sufficient to achieve an improvement in properties.

8. A method of making a foamed polyurethane elastomer of improved properties which comprises injecting via a RIM machine into a mold cavity of the desired configuration a foam formulation, demolding the molded article and post curing the demolded article at a temperature from about 310° F. to 350° F. for a time sufficient to achieve an improvement in properties said formulation being the reaction product of an aromatic polyisocyanate, a polyol of above about 500 equivalent weight and a chain-extending agent comprising a low molecular weight active hydrogen containing component of at least two (2) functionality wherein the polyisocyanate and chain-extender are chosen from products which yield an isocyanate chain-extender reaction product with a glass transition temperature of above about 325° F. and wherein the polyol is chosen from those products which do not significantly adversely affect the glass transition temperature of the isocyanate chain-extender reaction product.

9. A method of claim 8 wherein said chain-extending agent comprises ethylene glycol.

10. A method of claim 8 wherein said aromatic polyisocyanate is 4,4'-diphenylmethane diisocyanate.

11. A method of claim 8 wherein said polyol is a diol or triol having an equivalent weight of from about 1000 to about 3000 and contains at least about 50 percent primary hydroxyl groups.

12. The method of claim 8 wherein said polyol is a polyether polyol.

* * * * *